March 11, 1924.  1,486,683

J. E. S. PLUMRIDGE ET AL

MACHINE FOR COATING CONFECTIONERY AND OTHER EDIBLE MATERIALS

Filed Dec. 2, 1921

Inventors
John Edward Selves Plumridge
Herbert Easton
By
James L. Norris,
Attorney Patented Mar. 11, 1924.

1,486,683

UNITED STATES PATENT OFFICE.

JOHN EDWARD SELVES PLUMRIDGE AND HERBERT EASTON, OF BRISBANE, QUEENSLAND, AUSTRALIA.

MACHINE FOR COATING CONFECTIONERY AND OTHER EDIBLE MATERIALS.

Application filed December 2, 1921. Serial No. 519,422.

*To all whom it may concern:*

Be it known that we, JOHN EDWARD SELVES PLUMRIDGE and HERBERT EASTON, subjects of the King of Great Britain, residing at Fortitude Valley, Brisbane, in the State of Queensland, Commonwealth of Australia, have invented certain new and useful Improvements in Machines for Coating Confectionery and Other Edible Materials, of which the following is a specification.

This invention has reference to machines for coating confectionery, bon-bons, fruits, and other edible materials with icing or other prepared coating and has been devised mainly with the object of dipping the articles in batches, but separately one from the other, into the coating preparation with a minimum of waste; so securing the articles that they will not become displaced during the operation; and removing the surplus coating and returning it to the dipping trough.

The machine is operated by hand or power and we will now describe it in conjunction with the accompanying drawings so that it may be readily comprehended.

Figure 1 represents a perspective view of our machine, while

Figure 3:
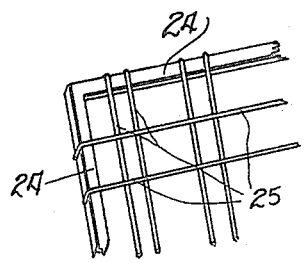

Figure 3, a similar view of the upper or retaining tray.

Figure 4:
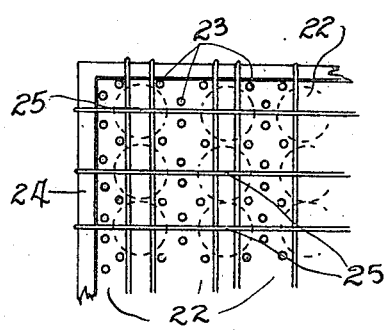

Figure 4 is a similar view showing the two trays fitted together.

The same numerals indicate the same or corresponding parts.

7 is the trough for holding the icing or coating preparation being provided with a transverse partition 8 forming a draining trough 9. One or more bearers 9$^A$ may be fixed thereon to act as supports to a scraper device. The standards 10 are secured to a base plate supporting the trough and terminate in bearings 11 in which rotates a shaft 12. This shaft has secured at its opposite ends, levers 13, one of which is provided with an operating handle 14, and connecting levers 15 are attached to said levers 13, the opposite ends of the lever 15 being connected to a transverse bar or rod 15$^A$ adapted to run in slots 16 and in guides 16$^A$. To said levers 15 is fixed a plate 17 provided on its underside with projections or pins 18. At each side of the trough 7 are resilient guides 19 connected by transverse rods or members 20 forming the dipping frame 20$^A$. A scraper 21 is provided for the purpose of removing the surplus coating from the dipping trays, said scraper being preferably positioned at the side of the trough 9. The lower dipping tray 22 has the spikes 23 arranged in sets, each of which sets holds an article to be coated while the upper or retaining tray 24 has cross wires 25 secured thereon which fit between the spikes 23 as shown in Figure 4.

Figure 1:
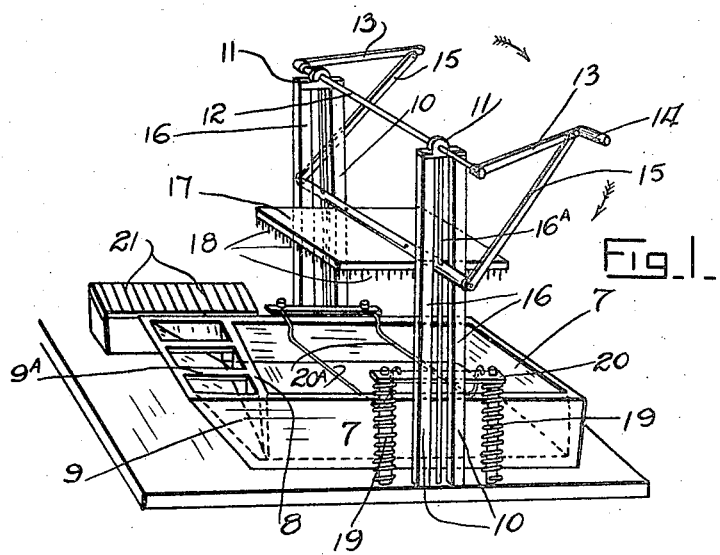
Figure 2:
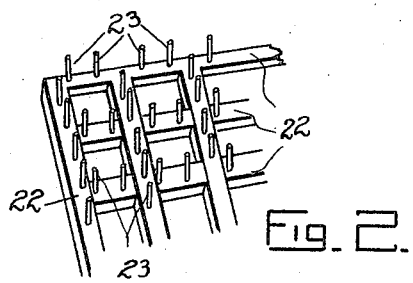
Figure 2 is a fragmentary perspective view of the lower tray.

In operation, the retaining tray 24 is fitted inside the tray 22 and a confectionery article placed in between each set of spikes 23 as shown by the dotted lines, Figure 4, the article resting on the crossed wires 25. The trays are then placed on the dipping frame 20$^A$ and the operating handle 14 revolved in the direction of the arrows, Figure 1, causing the pins 18 on plate 17 to come in contact with the tray holding the articles without damage thereto, said pins 18 being so positioned that they come into alignment between the spikes 23 and tray 22 pushing same down into the trough 7 containing the coating preparation. The resilient guides are compressed during this operation and when the levers are returned to the normal position, the levers thereby disengage the plate 17 from the trays and the springs return the dipping frame and trays clear of the preparation in the trough. The trays 22 and 24 are then lifted over onto the end of the trough 9 for draining and the retaining tray removed from the tray 22 carrying with it the articles which have been dipped. Tray 24 is then rubbed across the scraper 21 positioned at the side of the trough 9 to remove any drops or surplus coating preparation which falls into said trough.

We claim:—

1. In machines of the class described, a tray provided with spikes arranged in sets to hold separately the articles to be coated and a tray to fit on said spiked tray before the articles are placed therein to retain the articles substantially as described.

2. In machines of the class described, a trough containing a coating preparation, a tray adapted to carry articles to be coated, a vertical slidable plate provided with projections on its underside and adapted on its descent to force the tray into the trough containing the coating preparation, said projections being so fixed at points that they will not contact with said articles substantially as described.

3. In machines for coating confectionery and other edible materials, a trough for containing the coating preparation, standards having mounted thereon a transverse shaft adapted to be rotated by levers, a member connecting the levers capable of travelling in vertical slots in said standards, said members carrying a plate with depending projections, a resiliently mounted frame positioned over the trough, said frame being adapted to support trays holding the articles to be dipped, said trays being forced into the coating preparation on actuating the lever or levers to cause contact of said plate with said trays substantially as described.

In testimony whereof we have hereunto set our hands.

JOHN EDWARD SELVES PLUMRIDGE.
HERBERT EASTON.